United States Patent
Christiansen et al.

(10) Patent No.: US 10,223,746 B2
(45) Date of Patent: Mar. 5, 2019

(54) SYSTEMS AND METHODS FOR INFERRING THE PERFORMANCE OF REJECTED CREDIT APPLICANTS

(71) Applicant: LexisNexis Risk Solutions FL Inc., Boca Raton, FL (US)

(72) Inventors: James Christiansen, Chanhassen, MN (US); Eric Graves, Hopkins, MN (US); Lea Smith, Savage, MN (US); Darrin Udean, Lino Lakes, MN (US)

(73) Assignee: LexisNexis Risk Solutions FL Inc., Boca Raton, FL (US)

( * ) Notice: Subject to any disclaimer, the term of this patent is extended or adjusted under 35 U.S.C. 154(b) by 448 days.

(21) Appl. No.: 14/979,736

(22) Filed: Dec. 28, 2015

(65) Prior Publication Data
US 2016/0189293 A1 Jun. 30, 2016

Related U.S. Application Data

(60) Provisional application No. 62/097,230, filed on Dec. 29, 2014.

(51) Int. Cl.
*G06Q 40/02* (2012.01)
(52) U.S. Cl.
CPC .................. *G06Q 40/025* (2013.01)
(58) Field of Classification Search
CPC ............................ G06Q 40/025; G06Q 40/02
(Continued)

(56) References Cited

U.S. PATENT DOCUMENTS

| 8,024,263 B2 * | 9/2011 | Zarikian | G06Q 10/067 235/80 |
| 8,682,755 B2 * | 3/2014 | Bucholz | G06Q 50/265 705/19 |

(Continued)

OTHER PUBLICATIONS

Anthony Middleton, High-Performance Knowledge-Based Entity Extraction, 2009, Nova Southeastern University, pp. 1-306 (Year: 2009).*

(Continued)

*Primary Examiner* — Kenneth Bartley
(74) *Attorney, Agent, or Firm* — Troutman Sanders LLP; James E. Schutz; Mark Lehi Jones

(57) ABSTRACT

Certain implementations of the disclosed technology may include systems, methods, and apparatus for inferring the performance of rejected credit applicants using non-tradeline data. According to an example implementation, a method is provided for evaluating factors that may indicate financial distress and/or future credit performance associated with an applicant. In an example implementation, the method may include receiving applicant information associated with an applicant of a credit application. Responsive to a query, the method may include receiving by at least one processor, non-tradeline data related to the applicant. The method includes scoring, using a predictive scoring model, and based at least in part on the non-tradeline data, a prediction of the applicant's future credit performance. The method includes generating, based on the scoring, an estimated credit performance of the applicant over a predetermined period; and outputting an indication of the estimated credit performance.

20 Claims, 10 Drawing Sheets

(58) Field of Classification Search
USPC .......................................................... 705/38
See application file for complete search history.

(56) References Cited

U.S. PATENT DOCUMENTS

| | | | | |
|---|---|---|---|---|
| 10,089,686 B2* | 10/2018 | Straub | ................... | G06Q 40/025 |
| 2001/0037289 A1* | 11/2001 | Mayr | ...................... | G06O 40/02 |
| | | | | 705/38 |
| 2004/0235458 A1* | 11/2004 | Walden | ................. | H04W 88/02 |
| | | | | 455/414.1 |
| 2010/0005078 A1* | 1/2010 | Bayliss | ............. | G06F 17/30303 |
| | | | | 707/E17.014 |
| 2012/0059756 A1* | 3/2012 | Serio | ...................... | G06Q 40/02 |
| | | | | 705/38 |
| 2012/0226590 A1* | 9/2012 | Love | ....................... | G06Q 10/10 |
| | | | | 705/30 |
| 2014/0012716 A1* | 1/2014 | Bucholz | ................. | G06Q 40/00 |
| | | | | 705/30 |
| 2014/0067650 A1* | 3/2014 | Gardiner | .............. | G06Q 40/025 |
| | | | | 705/38 |
| 2014/0074689 A1* | 3/2014 | Lund | .................... | G06Q 40/025 |
| | | | | 705/38 |
| 2016/0071208 A1* | 3/2016 | Straub | .................. | G06Q 40/025 |
| | | | | 705/38 |
| 2016/0086262 A1* | 3/2016 | Straub | .................. | G06Q 40/025 |
| | | | | 705/38 |
| 2016/0110353 A1* | 4/2016 | Merrill | ................ | G06F 17/3012 |
| | | | | 707/748 |
| 2016/0189293 A1* | 6/2016 | Christiansen | ........ | G06Q 40/025 |
| | | | | 705/38 |

OTHER PUBLICATIONS

Xiaoxin Yin, "Scalable Mining and Link Analysis Across Multiple Database Relations," 2007, Univ. of Illinois at Urbana-Champaign, pp. 1-153. (Year: 2007).*

* cited by examiner

SYSTEMS AND METHODS FOR INFERRING THE PERFORMANCE OF REJECTED CREDIT APPLICANTS

CROSS REFERENCE TO RELATED APPLICATIONS

This application claims the benefit of U.S. Provisional Application No. 62/097,230, titled "SYSTEMS AND METHODS FOR INFERRING THE PERFORMANCE OF REJECTED CREDIT APPLICANTS," filed Dec. 29, 2014 and which is fully incorporated herein by reference.

FIELD

The disclosed technology relates to credit scorecard development and validation, and in particular, to systems and methods for inferring the performance of rejected credit applicants.

BACKGROUND

Credit scorecards are empirically derived statistical models that can be used to predict credit repayment performance of applicants based on their observable characteristics. For example, the credit scorecards may be based on applicant information available at the time of the application and performance over time, usually one to two years. Credit scorecards are typically developed based on known performance of a given population, then used to make decisions on future credit applicants whose performance is not yet known. Credit scorecards are used almost universally by financial institutions for bankcard and other unsecured loan underwriting.

Credit scorecards are periodically rebuilt, usually every five to seven years, to remain optimally predictive in light of changing economic, demographic, behavioral, and marketing conditions. Reject inference is a method for improving the quality of a scorecard based on the use of data contained in rejected loan applications. Prior reject inference methods have relied on scoring-based reject inference or evidence of other credit account (i.e., tradeline data) performance as an indicator for future credit performance. Financial institutions typically redevelop their scorecards based on the payment and default history of their credit applicants, as that population best reflects the targeted market of the institution, and the expected performance of a particular financial product. However, scorecard redevelopment can be complicated by the fact that a prior credit scorecard may have been used to make credit decisions when the existing customer population first applied for a new account. Some of the credit applicants may be rejected by the old scorecard because their predicted credit default rate was too high to be profitable under the terms of a particular financial product. Such applicants can be rejected and sent an Adverse Action letter informing them of their failure to pass credit underwriting. The letter may also include the primary reasons for that failure.

When credit applicants are declined, they may not have the opportunity to generate further information related to payment or credit default performance. Due to a lack of performance information, rejected applications are sometimes excluded from scorecard redevelopment, with the result that the new scorecard is not trained to detect the high risk segments that the old scorecard successfully rejected. This can result in a new scorecard that results in unexpectedly high credit losses.

BRIEF SUMMARY

Certain implementations of the disclosed technology may provide improved credit scorecard redevelopment for rejected applicants. Certain implementations may identify a proxy measure of performance for the rejected applicants. For example, certain implementations may utilize recorded financial and/or behavioral events documented in public record and/or other consumer report data as proxies for evidence of credit worthiness and economic distress of an applicant.

According to an example implementation, a method is provided for evaluating factors that may indicate financial distress and/or future credit performance associated with an applicant. In an example implementation, the method may include receiving, from a first information source, applicant information associated with a credit application. The method includes querying one or more public or private databases with at least a portion of the applicant information. Responsive to the querying, the method includes receiving from a second information source, a plurality of non-tradeline data related to the applicant. The method includes scoring, with one or more computer processors in communication with a memory, and using a predictive scoring model based at least in part on the non-tradeline data, at least one parameter of the applicant information and a prediction of the applicant's future credit performance. The method can further include generating, based on the scoring, an estimated credit performance of the applicant over a predetermined period and outputting an indication of the estimated credit performance.

In an example implementation of the disclosed technology, a system is provided that includes at least one memory for storing data and computer-executable instructions; and at least one processor configured to access the at least one memory and further configured to execute the computer-executable instructions to execute one or more of the method steps as outlined above.

Other implementations, features, and aspects of the disclosed technology are described in detail herein and are considered a part of the claimed disclosed technology. Other implementations, features, and aspects can be understood with reference to the following detailed description, accompanying drawings, and claims.

BRIEF DESCRIPTION OF THE FIGURES

Reference will now be made to the accompanying figures and flow diagrams, which are not necessarily drawn to scale, and wherein.

DETAILED DESCRIPTION

Figure 1:
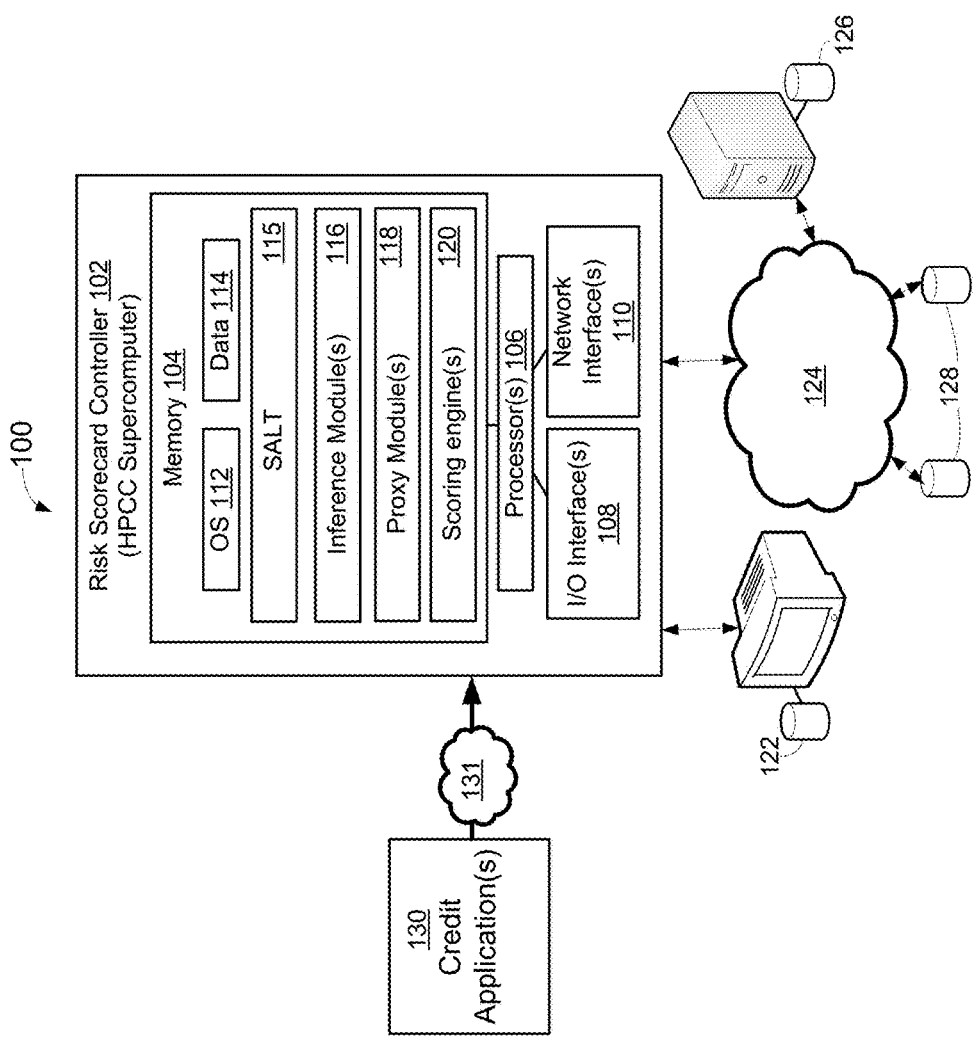
FIG. 1 is a block diagram of an illustrative credit scorecard inference system 100, according to an example implementation of the disclosed technology.

The disclosed technology relates to systems and methods for determining credit performance associated with an applicant or group of applicants. For example, credit performance information can provide an estimate of likelihood that an applicant will default (or not) on a credit account over a period. Certain example implementations of the disclosed technology may utilize non-credit account (i.e., non-tradeline) information to infer credit performance of a rejected applicant or applicants. For example, non-tradeline data can include public record data. In certain example implementations, the non-tradeline public record data may be utilized as a proxy for credit performance. Certain example implementations of the disclosed technology may utilize such public records in the development of empirically derived and statistically sound credit scorecards.

Certain example implementations of the disclosed technology may utilize credit-relevant behavioral data from public record sources to achieve a more accurate proxy for the credit outcome performance of rejected applicants, whereas prior credit rejection inference methods have relied on scoring-based reject inference or evidence of other credit account (tradeline) performance as an indicator for credit performance. For example, in traditional credit scorecard development, all or a portion of credit applicants who have been previously rejected as "bad" (i.e., a high likelihood of defaulting on credit) may be flagged in the redevelopment of a scorecard, with the result that the new scorecard will likely reject all of the same applicants who had failed the prior scorecard. While such an approach may prevent the new scorecard from unexpectedly high credit losses, it may also prevent the new scorecard from more accurately detecting credit worthy applicants who failed a prior credit scoring, with a resulting loss of potential profit.

Many financial institutions use a traditional credit bureau-based reject inference methodology that relies on searching credit files of rejected applicants to determine if they have obtained any other credit accounts during the one to two years after they were declined. The performance on these other credit accounts is used as an indicator for the performance on the declined account. Thus, a rejected applicant may be considered "good" in scorecard redevelopment if they opened and paid as agreed on any other credit account after the rejected application. A rejected applicant may be considered "bad" if they opened and defaulted on any credit account after the rejected application. Those rejected applicants who do not successfully open any account after the rejected application are either considered "bad" or are ignored in traditional scorecard redevelopment. Such credit bureau tradeline-based reject inference methods may improve scorecard redevelopment compared with traditional methods that ignore rejects or consider them to be defaults. However, additional improvements may be made, according to the disclosed technology, for effectively predicting credit default rates and for identifying credit-worthy segments which failed the prior scorecard.

Certain example implementations of the disclosed technology can include systems and methods for inferring credit performance of previously rejected applicants without relying on the rejected applicant successfully opening a new credit account in order to be included in the scorecard redevelopment. Instead, certain example implementations of the disclosed technology may rely on other recorded financial and behavioral events that are documented in public record and other consumer report data, for example, to act as proxies for evidence of credit worthiness and economic distress.

According to an example implementation of the disclosed technology, information sources and publically available documents including non-tradeline data (i.e., non-credit account related data) may be considered as relevant proxies as an indication of credit behavior and/or economic distress. Such sources/documents include, but are not limited to:

Federal Tax Liens;
State Tax Liens;
Bankruptcy Filings;
Court ordered Collections Judgments;
Small Claims Judgments;
Eviction Judgments;
Felony Convictions; and
Debt Collection Searches; etc.

Example implementations of the disclosed technology can utilize special-purpose computing systems and custom query language(s) in the processes described herein to provide meaningful results, as may be necessitated due to the sheer amount of data that needs to be tracked and analyzed to provide meaningful non-tradeline data.

Certain example implementations of the disclosed technology provide tangible improvements in computer processing speeds, memory utilization, and/or programming languages. Such improvements provide certain technical contributions that can enable the development of empirically derived and statistically sound credit scorecards. In certain example implementations, the improved computer systems disclosed herein may enable analysis of an entire population, such as all known persons in the United States, together with associated activities. The computation of such a massive amount of data, at the scale required to provide effective outlier detection and information, has been enabled by the improvements in computer processing speeds, memory utilization, and/or programming language as disclosed herein.

Those with ordinary skill in the art may recognize that traditional methods such as human activity, pen-and-paper analysis, or even traditional computation using general-purpose computers and/or off-the-shelf software, are not sufficient to provide the level of data processing for an effective estimation of credit performance based on non-credit related data. As disclosed herein, the special-purpose computers and special-purpose programming language(s) disclosed herein can provide improved computer speed and/or memory utilization that provide an improvement in computing technology, thereby enabling the disclosed inventions.

Certain example implementations of the disclosed technology may be enabled by the use of a special purpose HPCC systems in combination with a special purpose software linking technology called Scalable Automated Linking Technology (SALT). SALT and HPCC, are developed and offered by LexisNexis Risk Solutions, Inc., the assignee of the disclosed technology. HPCC Systems, for example, provide data-intensive supercomputing platform(s) designed for solving big data problems. As an alternative to Hadoop, the HPCC Platform offers a consistent, single architecture for efficient processing. The SALT modules, in conjunction with the HPCC Systems, provides technical improvements in computer processing that enable the disclosed technology and provides useful, tangible results that may have previously been unattainable. For example, certain example implementation of the disclosed technology may process massive data sets, which are computationally intensive, requiring special software and hardware.

One of the issues that has plagued previous credit scorecard solutions involving massive data sets is the extremely long run-times and large amount of memory/disk space required. One of the technical solutions provided by the technology disclosed herein concerns the enablement and efficiency improvement of computer systems and software to process non-tradeline data, and to provide the scorecard information in a reasonable amount of time. Certain example implementations of the disclosed technology may be utilized to increase the efficiency of estimating credit performance.

Determining relationships among various records, for example, can follow the classical n-squared process for both time and disk space. According to an example implementation of the disclosed technology, SALT provides a process in which light-weight self-joins may be utilized, for example, in generating embeddable common lisp (ECL). But disk-space utilization might still be high. Certain example implementations of the disclosed technology may enable a core join to be split into parts, each of which is persisted. This has the advantage of breaking a potentially very long join into n parts while allowing others a time slice. This has an effect of reducing disk consumption by a factor of n, provided the eventual links are fairly sparse. In terms of performance, it should be noted that if n can be made high enough that the output of each join does not spill to disk, the relationship calculation process may have significantly faster performance.

In accordance with certain example implementations, non-tradeline data may be processed by certain additional special programming and analysis software. For example, record linking fits into a general class of data processing known as data integration, which can be defined as the problem of combining information from multiple heterogeneous data sources. Data integration can include data preparation steps such as parsing, profiling, cleansing, normalization, and parsing and standardization of the raw input data prior to record linkage to improve the quality of the input data and to make the data more consistent and comparable (these data preparation steps are sometimes referred to as ETL or extract, transform, load).

Some of the details for the use of SALT are included in the APPENDIX section of this application. According to an example implementation of the disclosed technology, SALT can provide data profiling and data hygiene applications to support the data preparation process. In addition SALT provides a general data ingest application which allows input files to be combined or merged with an existing base file. SALT may be used to generate a parsing and classification engine for unstructured data which can be used for data preparation. In certain example implementations, the data preparation steps may be followed by record linking or clustering process. SALT provides applications for several different types of record linking including internal, external, and remote.

Data profiling, data hygiene and data source consistency checking, while key components of the record linking process, have their own value within the data integration process and may be supported by SALT for leverage even when record linking is not a necessary part of a particular data work unit. SALT uses advanced concepts such as term specificity to determine the relevance/weight of a particular field in the scope of the linking process, and a mathematical model based on the input data, rather than the need for hand coded user rules, which may be key to the overall efficiency of the method.

In accordance with an example implementation of the disclosed technology, and as discussed above, a persistent data structure may be utilized as part of splitting a core join, for example, to increase the performance of the computer processor and/or to reduce the disc/memory utilization requirements in determining relationships among records. The persistent data structure, according to certain example implementations of the disclosed technology, is a data structure that preserves the previous version of itself when it is modified. Such data structures may be effectively immutable, as their operations do not update the structure in-place, but instead may yield a new updated structure.

Certain example implementations may utilize a meld or merge operation that can create a new version from two previous versions. In certain example implementations, the persistent data structure(s) can also be created using in-place updating of data and these may, in general, use less time or storage space than their purely functional counterparts. In certain example implementations, persistence can be achieved by simple copying. Certain example implementations of the disclosed technology exploit a similarity between the new and old versions to share structure between versions.

Certain example implementations provide for disambiguating input information. For example, the input information may be received based on a query of one or more data sources. In accordance with an example implementation of the disclosed technology, input information may be processed, weighted, scored, etc., for example, to disambiguate the information. Certain implementations, for example, may utilize one or more input data fields to verify or correct other input data fields.

In certain example implementations, data may be received from a first information source. For example, certain identifying information related to an applicant, such as name, social security number, address, etc., may be considered as coming from the first information source, either directly from the applicant, from a previous scorecard, or via a vendor, business, governmental agency, etc. According to an example implementation of the disclosed technology, independent data from a second information source may be received to check or verify the data that is received from the first information source. In certain example implementations, the independent information from the second source is not provided by the applicant. However, in certain example implementation, all or a part of the applicant-supplied information (such as received from the first information source) may be at least partially utilized in the generation of the independent information.

In an example embodiment, applicant information associated with a credit application may include a requesting person's name, street address, and social security number (SSN), where the SSN has a typographical error (intentional or unintentional). In this example, one or more public or private databases may be searched to find reference records matching the input information. But since the input SSN is wrong, a reference record may be returned matching the name and street address, but with a different associated SSN.

According to certain example implementations, the input information may be flagged, weighted, scored, and/or corrected based on one or more factors or metrics, including but not limited to: fields in the reference record(s) having field values that identically match, partially match, mismatch, etc, the corresponding field values.

According to an example implementation of the disclosed technology, a model may be utilized to process applicant input information against reference information (for example, as obtained from one or more public or private databases) to determine whether the represented identity of the applicant being presented corresponds to a real identity, the correct identity, and/or a possibly fraudulent identity.

Certain example implementations of the disclosed technology may determine or estimate credit performance based upon a set of parameters. In an example implementation, the parameters may be utilized to examine the input data, such as name, address and social security number, for example, to determine if such data corresponds to a real identity. In an example implementation, the input data may be compared with the reference data, for example, to determine field value matches, mismatches, weighting, etc. In certain example implementations of the disclosed technology, the input data (or associated entity record) may be scored to indicate the probability that it corresponds to a real identity.

In some cases, a model may be utilized to score the applicant information elements, for example, to look for imperfections in the input data. For example, if the input data is scored to have a sufficiently high probability that it corresponds to a real identity, even though there may be certain imperfections in the input or reference data, once these imperfections are found, the process may disambiguate the data. In one example implementation, the disambiguation may be utilized to determine any other identities are associated with the input SSN. According to an example implementation, a control for relatives may be utilized to minimize the number of similar records, for example, as may be due to Jr. and Sr. designations Some implementations of the disclosed technology will be described more fully hereinafter with reference to the accompanying drawings. This disclosed technology may, however, be embodied in many different forms and should not be construed as limited to the implementations set forth herein.

FIG. 1 illustrates a credit scorecard inference system 100, according to an example implementation of the disclosed technology. In certain example embodiments, information associated with one or more credit applications 130 may be received by a risk scorecard controller 102 via a communication channel 131. In certain example implementations, the information associated with a credit application 130 can include (but is not limited to) an applicant's name, address, telephone number, social security number, date of birth, applicant's driver's license number, etc. Other information such as mother's maiden name, and previous addresses, may also be utilized in the credit application 130, according to exemplary embodiments of the disclosed technology.

In certain example implementations, the risk scorecard controller 102 may include, or be in the form of a supercomputer, such as an HPCC supercomputer. For example, certain implementations of the disclosed technology are enabled by the use of a special-purpose HPCC supercomputer 102 together with a SALT module 115, as described above, and as provided with further examples in the APPENDIX.

According to an example implementation of the disclosed technology, the system 100 may include a risk scorecard controller 102, which may be in the form of a special-purpose supercomputer (for example HPCC). The risk scorecard controller 102 may be in communication with one or more data sources and may be configured to process data associated with credit applications 130. In accordance with certain example implementation of the disclosed technology, the risk scorecard controller 102 may be configured to receive and process data obtained from various sources 126 168, such as public and/or private data repositories or databases. In certain example implementations, the data obtained and processed may include non-tradeline data, as previously discussed. In accordance with an example implementation of the disclosed technology, credit-related and/or non-credit-related data may be utilized to link records, scrub data, remove duplicates, cluster records, disambiguate records, etc.

Referring again to FIG. 1, and according to an example implementation of the disclosed technology, the risk scorecard controller 102 may include a memory 104, one or more processors 106, one or more input/output interface(s) 108, and one or more network interface(s) 110. In accordance with an exemplary embodiment, the memory 104 may include an operating system 112 and data 114. In certain example implementations, one or more record linking modules, such as a SALT module 115 may be included in the system 100, for example, to instruct the one or more processors 106 for analyzing relationships within and among records.

In certain example implementations, the controller 102 of the system 100 may be configured to process data received from various data sources, including but not limited to a local database 122, and/or external databases or sources 126 128. In certain example implementations, the data and records associated with the various sources 122 126 128 may be provided directly through a direct communication channel, such as via an I/O interface 108 in communication with a local database or source 122, and/or via remote databases 126 128 and via a network 124 such as the Internet.

In certain exemplary embodiments, the memory 104 associated with the risk scorecard controller 102 may include an operating system 112 and data 114. According to certain embodiments, the memory 104 may be configured to load certain data processing modules for analyzing and processing the data from the credit application 130. For example, the memory 104 may include one or more SALT modules 115, one or more inference modules 116, one or more proxy models 118, and/or one or more scoring engines 120. According to an exemplary embodiment, the scoring engines 120 may utilize the SALT modules 115, proxy modules 118 and/or the inference modules 116 in processing the information associated with the credit application 130. According to exemplary embodiments, proxy information may be utilized to evaluate and/or categorize application information for inferring credit performance.

According to an example implementation of the disclosed technology, the controller 102 may process various records of a population to determine relationships and/or connections with an applicant associated with a credit application 130. In accordance with an example implementation of the disclosed technology, the analysis may yield other individuals that are directly or indirectly associated with the applicant. In certain example implementations, such relationships may include one or more of: one-way relationships, two-way relationships, first degree connections, second degree connections etc., depending on the number of intervening connections.

Figure 2:
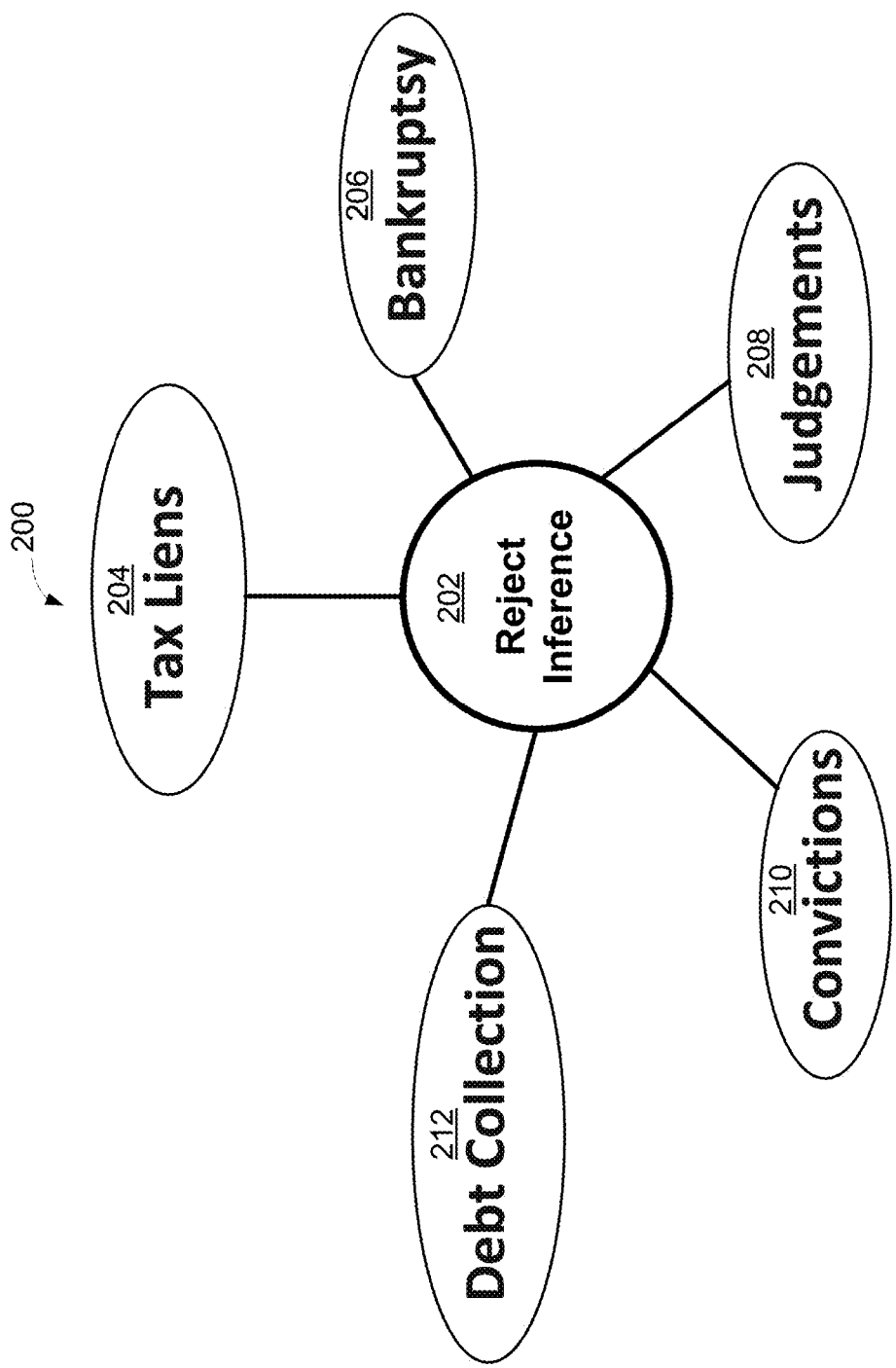
FIG. 2 is an illustrative block diagram depicting factors 200 for inferring evaluating financial distress and/or future credit performance for a rejected applicant, according to an example implementation of the disclosed technology.

FIG. 2 depicts public information 200 (i.e., non-tradeline data) that can be tracked, stored, and utilized in a credit reject inference 202 determination process, according to an exemplary embodiment of the disclosed technology. This information associated with an application and/or an applicant can include, but is not limited to records related to tax liens 204, bankruptcy records 206, judgments 208, convictions 210, and/or debt collection activities 212.

In certain example implementations, the applicant information may be reviewed for characteristics that may be useful in determining a credit risk. For example, based on the address of the applicant, localized information such as neighborhood crime, turnover rate, vacancies, etc., may be utilized for part of the risk evaluation and processing. According to an exemplary embodiment, validation of the application information may be carried out by comparing the applicant-supplied information with the information available on certain public and/or non-public databases. In an exemplary embodiment, a social security number, address, and/or driver's license number may be cross-checked with the available bureau or public information to verify the applicant's supplied information.

According to another exemplary embodiment, information correlation may be utilized in conjunction with the credit performance evaluation and inference. For example, certain sources may report multiple data elements, with certain elements being reported together. For example, a first credit bureau may report the applicant's name and telephone number, while a second credit bureau may report the applicant's name, but with a different telephone number. If a third credit bureau reports the applicant's name and the same telephone number as reported by the first or second credit bureau, then such information may be useful in verifying the application data supplied by the applicant.

According to another exemplary embodiment, information velocity may be utilized in conjunction with the credit performance evaluation. For example, an applicant may attempt to obtain credit from multiple sources over a short period of time, which may indicate fraud. On the other hand, such attempts to obtain credit from multiple sources may be due to an applicant seeking additional credit for financing valid activities, for example, such as remodeling a home. Tracking and analyzing industry types associated with the velocity may be useful for determining credit risk. According to an exemplary embodiment, the types of industry searching, the recent number of searches, and/or the number of searches per application element are examples of the types of information that may be analyzed for determining velocity.

According to another exemplary embodiment, information divergence may be utilized in conjunction with the credit performance evaluation. For example, information from one data source that is not consistent, or that does not match with similar information from other data sources may be indicative of credit risk. In one exemplary embodiment, a person's name and social security number supplied on the application may be checked against reported records with the same name or social security to see if there are discrepancies. A similar process can be carried out using the applicant's name and address, or address and phone number, etc. According to exemplary embodiments, the number of discrepancies in this process may provide information for evaluating risk according to the divergence classification.

Certain example implementations of the disclosed technology may employ additional information for determining credit performance. According to an exemplary embodiment, classifications of information associated with an identity can include, but are not limited to, history classification, sources classification, associates classification, verification classification, velocity classification, and/or variation classification.

In an exemplary embodiment, the history classification, for example, may include applicant information duration of time since the last date update, number of records on file, and/or the number of sources for a particular file item. According to exemplary embodiments, such information may be utilized separately or in various combinations to provide confidence values or weightings for determining the reliability of the information. For example, an applicant having only a few recent records on file may be considered to have a high credit default risk relative to an applicant having a full history of records from a number of sources.

In an exemplary embodiment, the source classification may utilize the type of source confirming the identity. For example, in certain embodiments, sources can include a credit bureau. In certain embodiments, sources can include government information, public records, or other available information sources. According to exemplary embodiments, the source information may be utilized separately or in various combinations for scoring credit performance and/or determining the reliability of information. For example, some sources may be considered to be more reliable than others, and the information obtained from the various sources may be weighted accordingly.

In an exemplary embodiment, the associates classification may be utilized to determine colleagues, peers, relatives, etc., that may be associated with the applicant. For example, data relating to the associates classification may include the number of associates or relatives that are tied, connected, or otherwise associated with the applicant. In some embodiments, the associate classification data can be utilized to determine if there are associates or relatives of the applicant with suspicious activity, fraud, or other factors that may indicate high credit default risk or otherwise influence the estimation of credit performance for an applicant.

In an exemplary embodiment, data related to the verification classification may be utilized to verify the applicant's identity. For example, verification of the applicant's identity can be scored based in part on the number of sources that confirm the identity of the application. Additionally, and according to certain exemplary embodiments, the types of sources that confirm the applicant's identity may provide a further measure of the validity of the applicant's identity. For example, some data source accessed may be considered to have reliable and up-to date information associated with an applicant, while other sources may have somewhat less reliable information. Government issued motor vehicle registration, for example, may be associated with the applicant. According to exemplary embodiments, confirming sources may provide information confirming the applicant's address, social security number, name, date of birth, etc. The type and number of confirming sources may, separately or in combination, provide additional indicators of reliability of the information.

In an exemplary embodiment, data related to the velocity classification may be utilized with the other classification and information, for determining applicant's credit default risk or credit performance. For example, the velocity classification may relate to the number of searches performed for a given applicant over a given period. In certain situations, the velocity of credit checks, database access, identification searches, third party searches, number or searches per application, etc., may provide additional indications of credit performance.

In accordance with exemplary embodiments, another classification that may be utilized to detect credit default risk is a variation classification. This classification may be utilized to track and/or tabulate changes and/or frequency of changes in applicant data, including changes related to personal information such as social security numbers, names, address, etc. According to an exemplary embodiment, the frequency of changes (or number of changes over a given period) with respect to any of the applicant data may also be determined for use with the velocity classification. For example, applicants who provide different personal information from application to application may pose a higher risk for credit default compared with someone who submits very little change in their personal information from application to application.

In accordance with exemplary embodiments, the applicant-supplied personal information may be analyzed to determine if such information corresponds to conditions that indicate high credit default risk. For example, a social security number (SSN) can be checked to determine if it is valid or not. An invalid SSN, a SSN supplied by the applicant that corresponds to a person who has been reported as deceased, an SSN issued prior to the applicant's date-of-birth; and/or a SSN used by multiple different identities would all be indicators of high credit default risk. Another indicator of high credit default risk includes multiple suspicious identities at the applicant's address.

According to exemplary embodiments, the applicant's residential address history may be taken into account for determining credit default risk. For example, the length of residence at one or more addresses, the number of address moves, and/or the number of utility connects and disconnects may be indicators of credit default risk.

In certain example implementations, the SALT module (see APPENDIX), in conjunction with the HPCC Systems, provides technical improvements in computer processing that enable the disclosed technology and provides useful, tangible results that may have previously been unattainable. For example, certain example implementation of the disclosed technology may process massive data sets, which are computationally intensive, requiring special software and hardware. For example, one or more of the history classification, sources classification, associates classification, verification classification, velocity classification, and/or variation classification, as described above, may be enabled or may be improved in terms of speed and accuracy by the SALT module in conjunction with the HPCC Systems.

Figure 3:
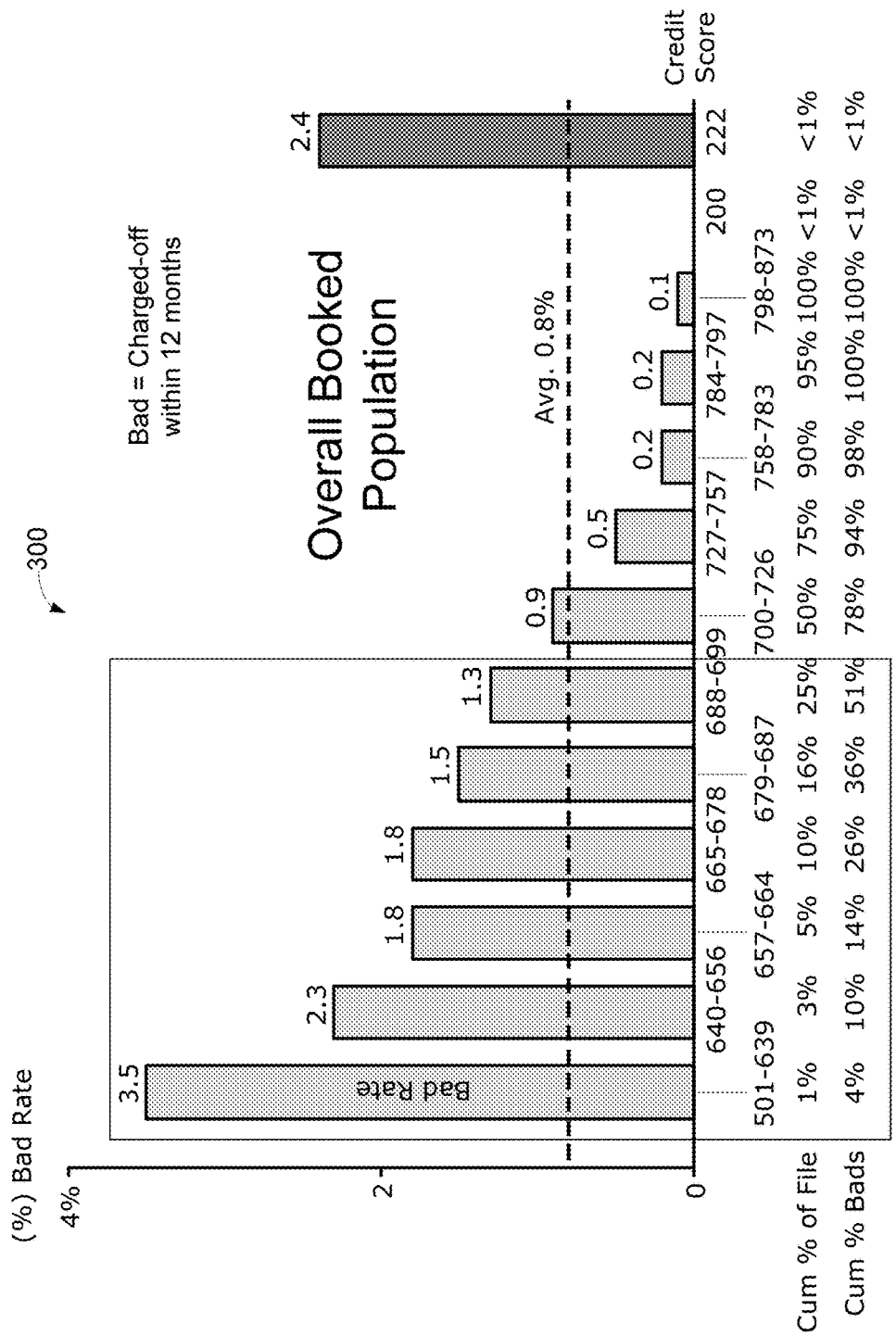
FIG. 3 is a chart 300 of illustrative bad credit data for an overall booked population.

FIG. 3 is a chart 300 of illustrative bad credit data vs. a traditional credit score for an example overall booked population. For example, about 3.5% of applicant's (in this data set) with a credit score of 501-639 have defaulted on credit, resulting in a charge-off within the past 12 months, and so on. The average default rate for this data set is about 0.8%. As shown in the chart 300 within the dashed-line area, approximately 51% of the defaulted applicants ("bads") are represented by 25% of the population as ranked by credit score. Thus, one may conclude that the credit score alone is a good indicator of credit performance.

Table 1 shows a set of reject inference data based on non-tradeline information, in accordance with an example implementation of the disclosed technology. The inferred bad rate corresponds to a prediction of new collections searches and/or major derogatory flags in an account within the next 12 months. In this example, the overall inferred bad rate (0.83%) is very close to the known bad rate (0.82%) for booked applicants. The data indicates that approved, but unbooked applicants have a higher inferred bad rate (1.46%), and that declined applicants have much higher inferred bad rates (7.17%). This dataset further indicates that the best scoring 10% of the rejected applicants have about a 1% inferred bad rate.

TABLE 1

| | | | | | | | | |
|---|---|---|---|---|---|---|---|---|
| | | | Reject Inference data | | | | | |
| Score | # of Applications | # of booked | Known C/O Rate on Booked | Inf Bad Rate on Booked | # of Approved, Unbooked | Inf Bad Rate on Unbooked | # of Declined | Inf Bad Rate on Declined |
| Low<–664 | 181,834 | 12,228 | 2.36% | 2.96% | 2,392 | 3.09% | 167,214 | 14.41% |
| 664<–678 | 81,660 | 12,766 | 1.79% | 1.62% | 2,157 | 2.27% | 66,737 | 6.32% |
| 678<–687 | 63,047 | 13,294 | 1.49% | 1.50% | 2,073 | 2.22% | 47,680 | 4.75% |
| 687<–693 | 43,685 | 10,969 | 1.40% | 1.09% | 1,669 | 1.86% | 31,047 | 3.70% |
| 693<–699 | 42,275 | 12,248 | 1.16% | 1.17% | 1,763 | 2.04% | 28,264 | 3.38% |
| 699<–705 | 40,377 | 12,963 | 1.04% | 0.97% | 1,892 | 1.22% | 25,522 | 2.99% |
| 705<–710 | 31,836 | 11,324 | 1.16% | 0.87% | 1,562 | 1.22% | 18,950 | 2.82% |
| 710<–716 | 35,583 | 13,825 | 0.97% | 0.80% | 1,807 | 1.72% | 19,951 | 2.37% |
| 716<–721 | 27,476 | 11,804 | 0.69% | 0.73% | 1,394 | 1.51% | 14,278 | 2.33% |
| 721<–726 | 25,144 | 11,315 | 0.65% | 0.59% | 1,439 | 1.32% | 12,390 | 1.85% |
| 726<–732 | 27,571 | 13,308 | 0.81% | 0.67% | 1,684 | 1.01% | 12,579 | 2.03% |
| 732<–738 | 24,315 | 12,236 | 0.52% | 0.62% | 1,563 | 0.90% | 10,516 | 1.35% |
| 738<–744 | 21,948 | 11,680 | 0.46% | 0.54% | 1,425 | 1.19% | 8,843 | 1.57% |
| 744<–751 | 22,780 | 12,837 | 0.38% | 0.48% | 1,504 | 1.20% | 8,439 | 1.26% |
| 751<–757 | 17,491 | 10,445 | 0.34% | 0.47% | 1,136 | 0.53% | 5,910 | 1.13% |
| 757<–765 | 20,881 | 12,982 | 0.28% | 0.43% | 1,419 | 0.85% | 6,480 | 1.11% |
| 765<–773 | 18,195 | 11,912 | 0.24% | 0.30% | 1,278 | 0.86% | 5,005 | 0.70% |
| 773<–783 | 18,327 | 12,691 | 0.20% | 0.23% | 1,304 | 0.77% | 4,332 | 0.55% |
| 783<–797 | 16,124 | 11,873 | 0.23% | 0.21% | 1,084 | 0.28% | 3,167 | 0.47% |
| 797<–High | 15,281 | 11,600 | 0.08% | 0.18% | 1,129 | 0.44% | 2,552 | 1.02% |
| Subtotal | 775,830 | 244,300 | 0.82% | 0.83% | 31,674 | 1.46% | 499,856 | 7.18% |
| 200 | 259 | 23 | 0.00% | 0.00% | 14 | 7.14% | 222 | 6.31% |
| 222 | 2,111 | 123 | 2.44% | 0.81% | 23 | 0.00% | 1,965 | 4.12% |
| Subtotal | 2,370 | 146 | 2.05% | 0.68% | 37 | 2.70% | 2,187 | 4.34% |
| Total | 778,200 | 244,446 | 0.82% | 0.83% | 31,711 | 1.46% | 502,043 | 7.17% |

Figure 4:
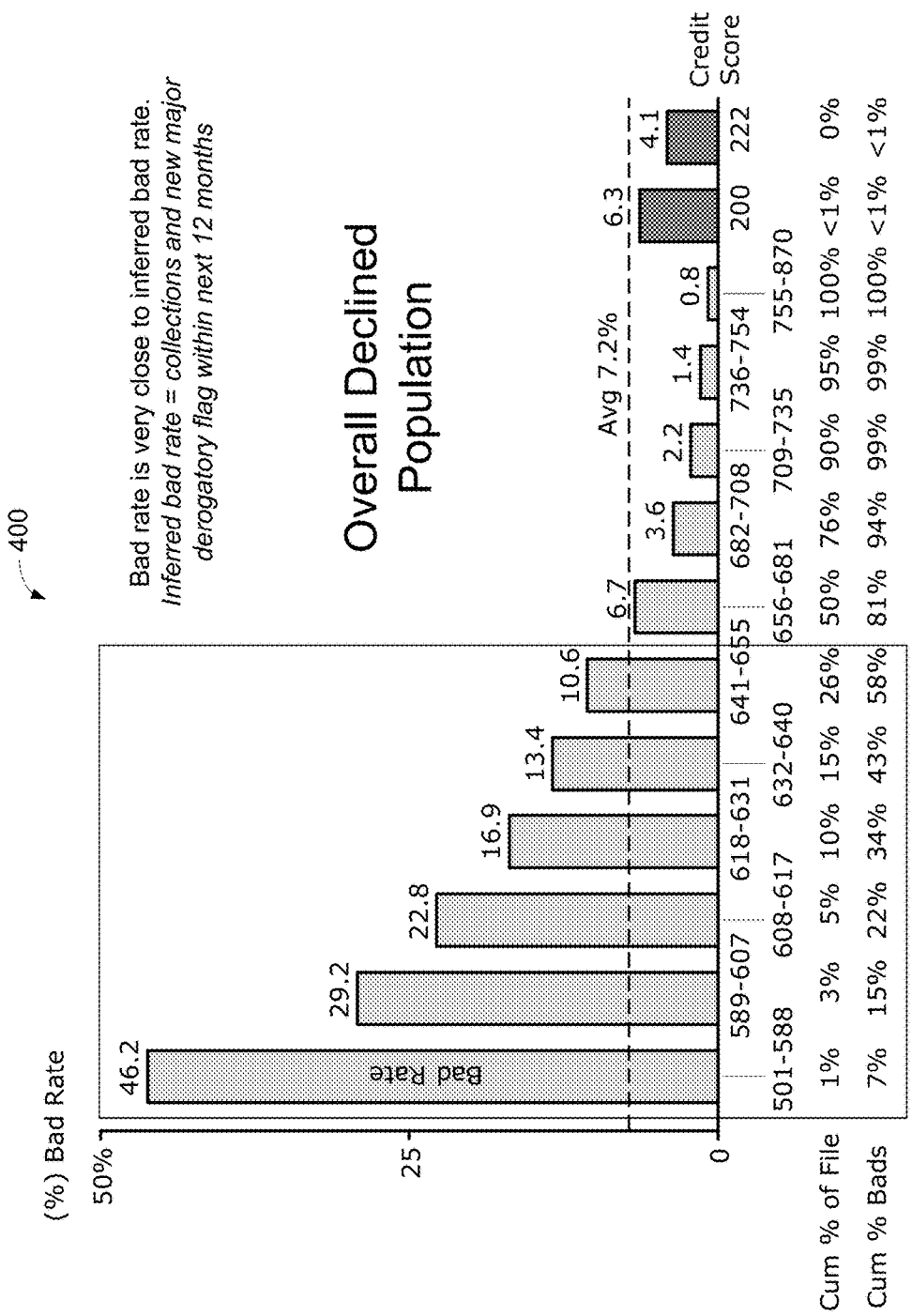
FIG. 4 is a chart 400 of illustrative bad credit data for an overall declined population, according to an example implementation of the disclosed technology.

FIG. 4 is a chart 400 of illustrative inferred bad credit data vs. credit score (as presented in Table 1) for a population of applicants who have previously been declined on a credit application, where the inferred information is based on non-tradeline data. In this example, about 46.2% of these applicant's having a credit score of 501-558 range are predicted to default on credit (inferred bad), resulting in collections and a derogatory flag on their account within the next 12 months, and so on. The average default rate for this data set is about 7.2%. As shown in the chart 400 within the dashed-line area, approximately 58% of the "bads" are represented by about 26% of the population as ranked by credit score. Also, as indicated in the chart 400, the applicants with high credit scores have very low inferred bad rates, even though they have had their credit declined in the past. Again, the data indicates that the best scoring 10% of the rejected applicants have about a 1% inferred bad rate. Certain example implementations of the disclosed technology may re-categorize such previously rejected applicants to allow credit, where previous methods may have rejected them due to a previous credit rejection.

Figure 5:
FIG. 5 is a chart 500 of illustrative bad credit data for an overall population, according to an example implementation of the disclosed technology.

FIG. 5 is a chart 500 of illustrative inferred bad credit data for an overall population having few bads, according to an example implementation of the disclosed technology. The data representative of this population indicates that the worst scoring 10% have an average bad rate of 1.55%, which is more than twice the average of 0.62%. The data indicates that the best scoring 39% of the population has a bad rate that is 0.34%, which is about half of the average bad rate.

According to certain example implementations of the disclosed technology, non-tradeline data, such as derogatory public records (for example, eviction judgments, collection judgments, federal or state tax liens, and/or felony convictions, etc.) may be utilized to infer credit performance over a given time period following an application date. For example, applications may be inferred as bad credit risks over a performance window (such as 12 months) following the application date by considering derogatory event information available in the public record. This example will be illustrated with reference to FIGS. 6-8.

Figure 6:
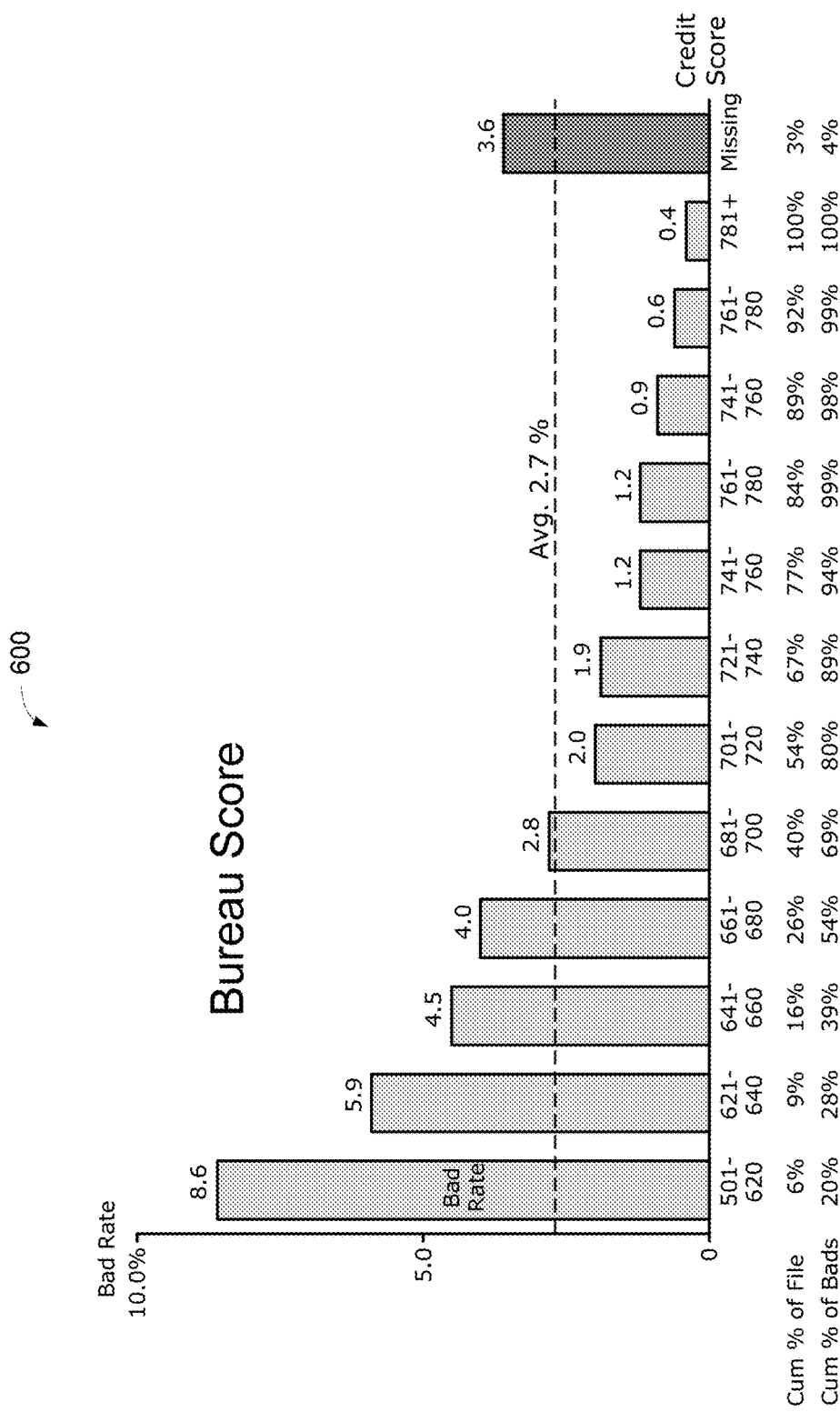
FIG. 6 is a chart 600 of illustrative rankings of credit performance based on national credit scores.
Figure 7:
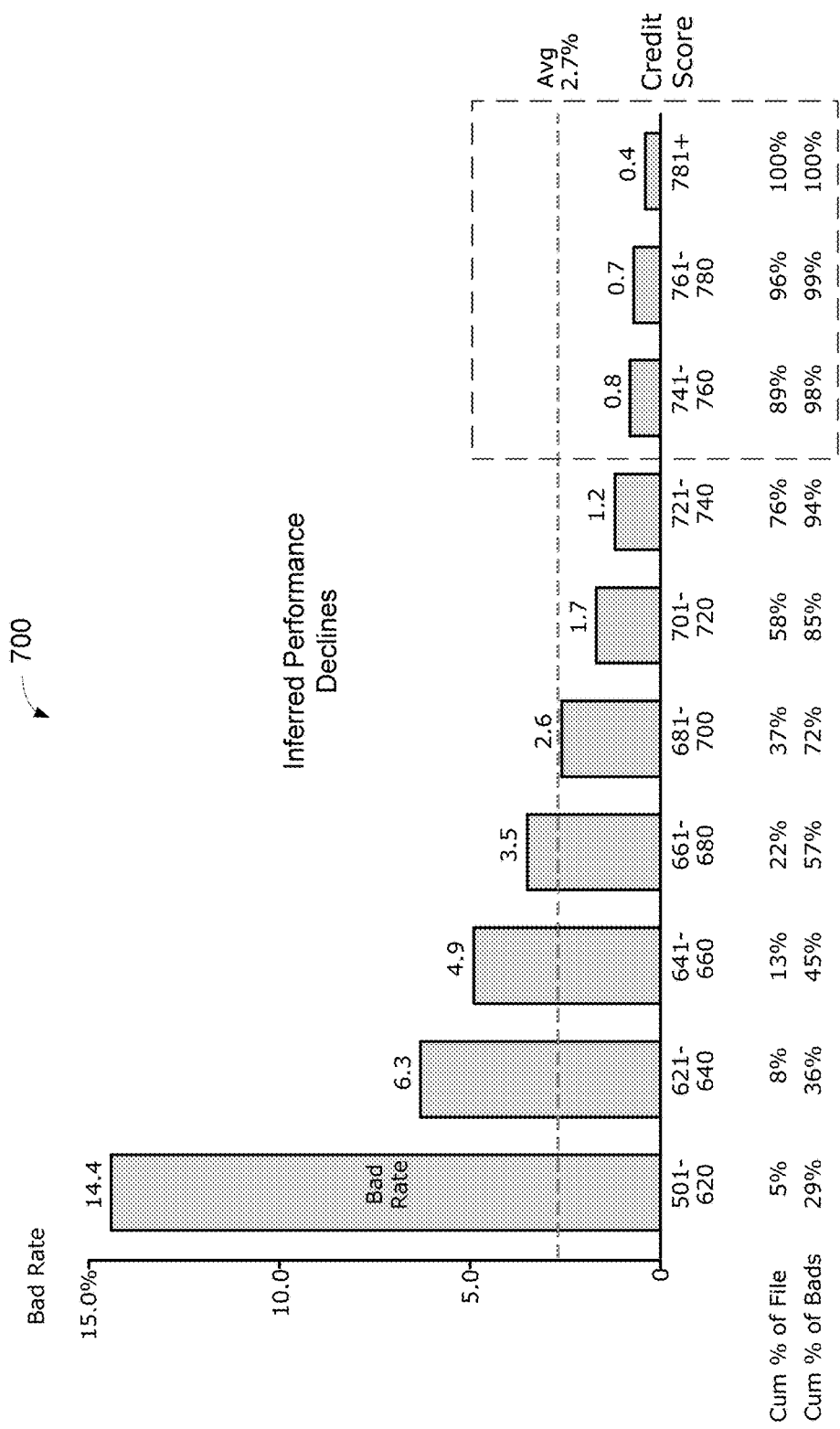
FIG. 7 is a chart 700 of illustrative inferred performance of declines, according to an example implementation of the disclosed technology.
Figure 8:
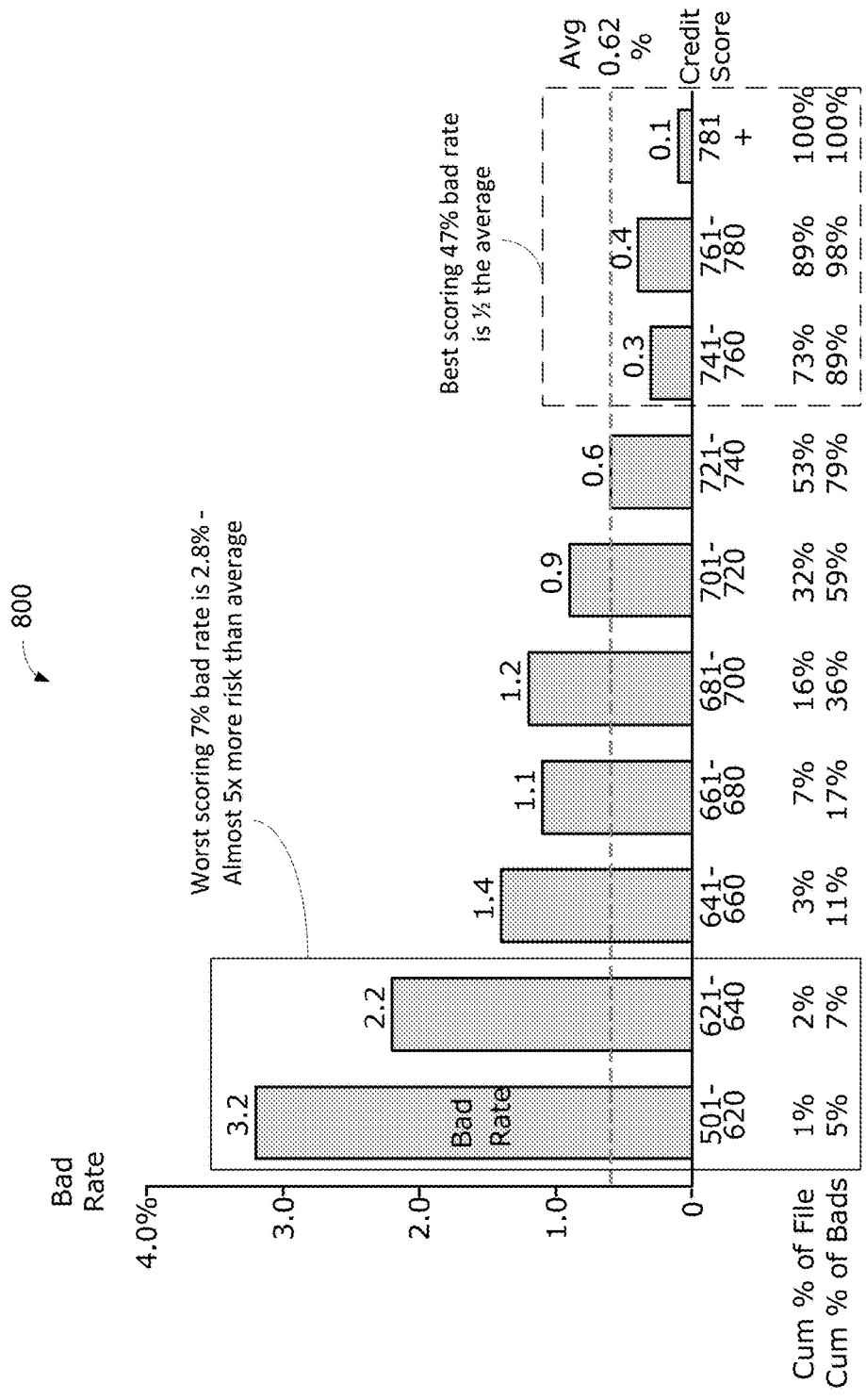
FIG. 8 is a chart 800 of illustrative score performance of booked applicants, according to an example implementation of the disclosed technology.

FIG. 6 is a chart 600 of illustrative rankings of inferred performance based on national bureau credit scores. FIG. 7 is a chart 700 of illustrative inferred performance of declined applications based on the non-tradeline data, according to an example implementation of the disclosed technology. As indicated by the dashed line area, the good score ranges have very low inferred losses. FIG. 8 is a chart 800 of illustrative score performance of booked applicants, according to an example implementation of the disclosed technology. As indicated, the worst scoring 7% has a bad rate of 2.8%, which is almost 5 times the average of 0.62% for this population. Also, the best scoring 47% of this population has a bad rate that is about half the average of 0.62%. Again, the data indicates that previously rejected (declined) applicants may be categorized based on non-tradeline data to allow credit, where previous methods may have rejected them due to a previous credit rejection.

Figure 9:
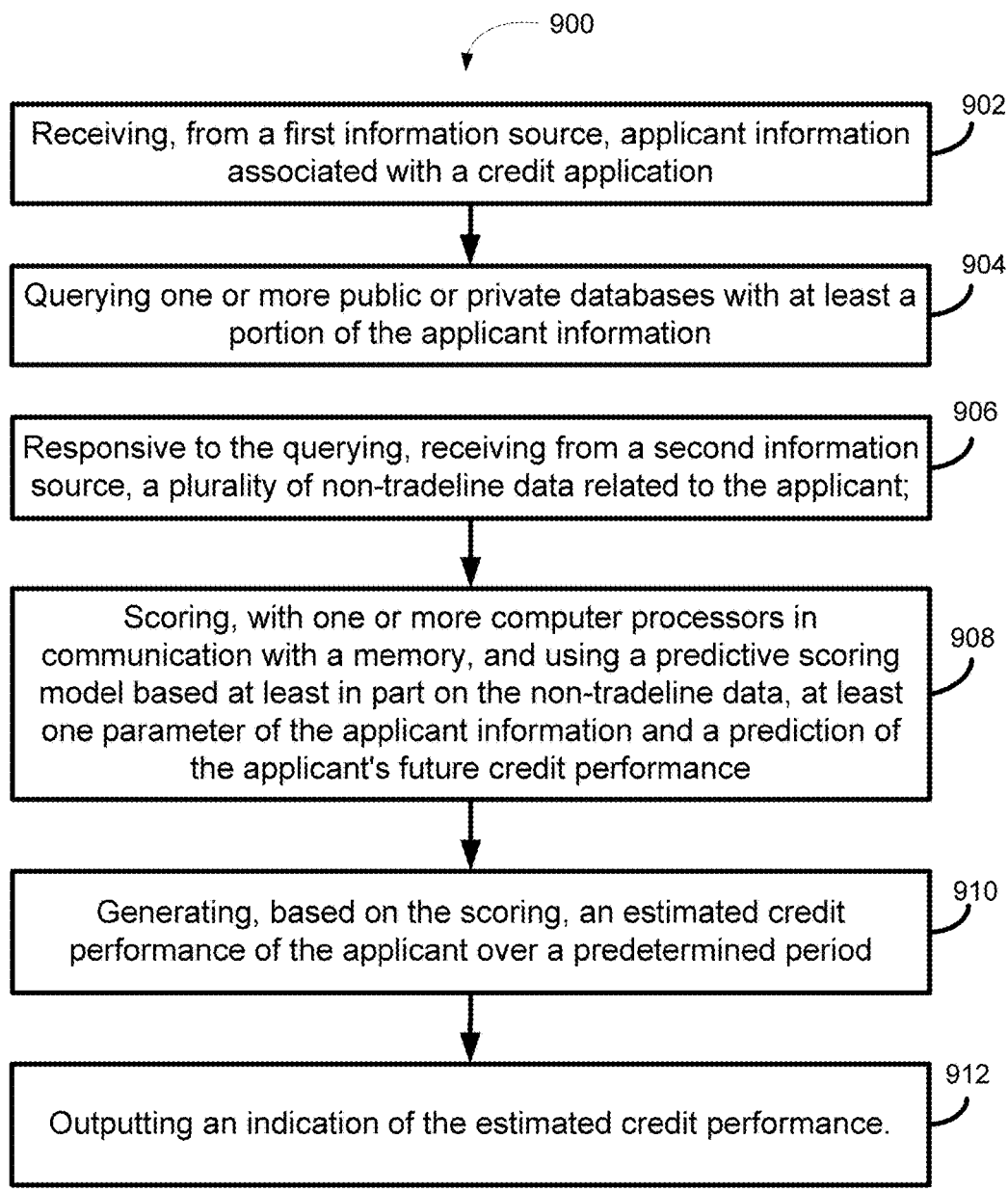
FIG. 9 is a flow diagram of a method 900 according to an example implementation of the disclosed technology.

FIG. 9 is a flow diagram of a method 900 according to an example implementation of the disclosed technology. In block 902, the method 900 includes receiving, from a first information source, applicant information associated with a credit application. In block 904, the method 900 includes querying one or more public or private databases with at least a portion of the applicant information. In block 906, and responsive to the querying, the method 900 includes receiving from a second information source, a plurality of non-tradeline data related to the applicant. In block 908, the method 900 includes scoring, with one or more computer processors in communication with a memory, and using a predictive scoring model based at least in part on the non-tradeline data, at least one parameter of the applicant information and a prediction of the applicant's future credit performance. In block 910, the method 900 includes generating, based on the scoring, an estimated credit performance of the applicant over a predetermined period. In block 912, the method 900 includes outputting an indication of the estimated credit performance.

In certain example implementations, an applicant associated with the applicant information is represented as a natural person.

According to an example implementation of the disclosed technology, the applicant information includes at least a name, a social security number (SSN), and a street address.

In certain example implementations, none of the non-tradeline data is provided by the applicant.

In accordance with an example implementation of the disclosed technology, the method, as discussed with reference to the flow diagram of FIG. 9 may further include one or more of: receiving from a third information source, a plurality of independent information related to the applicant; determining, with the one or more computer processors, based at least in part on a comparison of the applicant information with at least a portion of the plurality of independent information, a first validity indication of the applicant information; creating, with the one or more computer processors, disambiguated applicant records responsive to the first validity indication by one or more of: performing data cleansing on one or more of the applicant information and the plurality of independent information to eliminate one or more name variations; and adding metadata record to one or more of the applicant information and the plurality of independent information; determining, with the one or more computer processors, relationships among the disambiguated applicant records by one or more of: creating a core join data structure with at least a portion of all available disambiguated applicant records; splitting the core join data structure into persisted parts; and clustering one or more of the persisted parts and the disambiguated applicant records; and wherein scoring at least one parameter of the applicant information is based at least in part on determining the relationships among the disambiguated applicant records.

In certain example implementations, the at least one parameter of the applicant information comprises a distance between an applicant street address provided with the applicant information and a street address of one or more relatives or entities associated with the applicant.

In certain example implementations, the at least one parameter of the applicant information comprises a number of records associating the applicant SSN and the applicant street address.

In certain example implementations, the at least one parameter of the applicant information comprises a number of unique SSNs associated with a street address of the applicant.

In certain example implementations, the at least one parameter of the applicant information comprises a number of sources reporting a SSN of the applicant with a name of the applicant.

In certain example implementations, the at least one parameter of the applicant information comprises a number of other entities associated with the applicant SSN.

Certain example implementations may further include scoring neighborhood fraud metrics based on a street address of the applicant and further based on one or more of: presence of businesses in the surrounding neighborhood; density of housing in the neighborhood; and median income in the neighborhood.

According to an example implementation of the disclosed technology, receiving from the second information source, the plurality of non-tradeline data related to the applicant can include receiving one or more records comprising one or more of housing records, vehicular records, marriage records, divorce records, hospital records, death records, court records, property records, incarceration records, tax records, bankruptcy records; collections records, eviction records, felony records, and utility records, wherein the utility records comprise one or more of utility hookups, disconnects, and associated service addresses.

Figure 10:
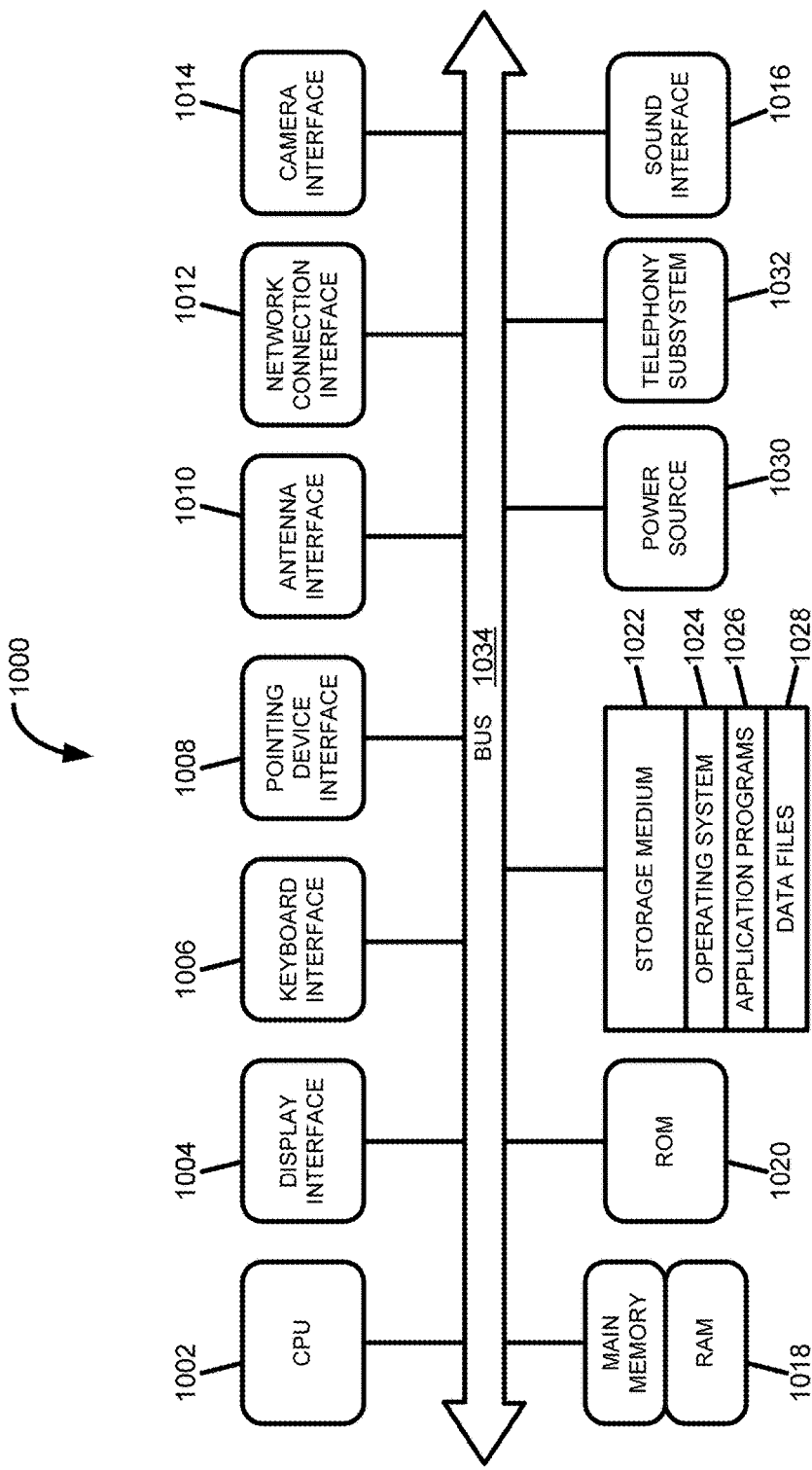
FIG. 10 is a block diagram of a computing system 1000 according to an example implementation of the disclosed technology.

FIG. 10 depicts a block diagram of an illustrative computer system 1000 and/or supercomputer system architecture according to an exemplary embodiment of the disclosed technology. Certain aspects of FIG. 10 may also be embodied in the supercomputer 102, as shown in FIG. 1. Various embodiments of the communication systems and methods herein may be embodied in non-transitory computer readable media for execution by a processor. It will be understood that the architecture illustrated in FIG. 10 is provided for exemplary purposes only and does not limit the scope of the various embodiments of the communication systems and methods. In certain example implementations, the computing device or system 1000 may be a specialized HPCC Systems, as developed and offered by LexisNexis Risk Solutions, Inc., the assignee of the disclosed technology. HPCC Systems, for example, provide data-intensive supercomputing platform(s) designed for solving big data problems. Various implementations and methods herein may be embodied in non-transitory computer readable media for execution by a processor.

The architecture 1000 of FIG. 10 includes a central processing unit (CPU) 1002, where computer instructions are processed; a display interface 1004 that acts as a communication interface and provides functions for rendering video, graphics, images, and texts on the display; a keyboard interface 1006 that provides a communication interface to a keyboard; and a pointing device interface 1008 that provides a communication interface to a pointing device or touch screen. Exemplary embodiments of the system 1000 may include an antenna interface 1010 that provides a communication interface to an antenna; a network connection interface 1012 that provides a communication interface to a network. In certain embodiments, a camera interface 1014 is provided that acts as a communication interface and provides functions for capturing digital images from a camera. In certain embodiments, a sound interface 1016 is provided as a communication interface for converting sound into electrical signals using a microphone and for converting electrical signals into sound using a speaker. According to exemplary embodiments, a random access memory (RAM) 1018 is provided, where computer instructions and data are stored in a volatile memory device for processing by the CPU 1002.

According to an exemplary embodiment, the architecture 1000 includes a read-only memory (ROM) 1020 where invariant low-level systems code or data for basic system functions such as basic input and output (I/O), startup, or reception of keystrokes from a keyboard are stored in a non-volatile memory device. According to an exemplary embodiment, the system 1000 includes a storage medium 1022 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files include an operating system 1024, application programs 1026 (including, for example, Knowledge Engineering Language, SALT, a web browser application, a widget or gadget engine, and or other applications, as necessary) and data files 1028 are stored. According to an exemplary embodiment, the architecture 1000 includes a power source 1030 that provides an appropriate alternating current (AC) or direct current (DC) to power components. According to an exemplary embodiment, the system 1000 includes and a telephony subsystem 1032 that allows the device 1000 to transmit and receive sound over a telephone network. The constituent devices and the CPU 1002 communicate with each other over a bus 1034.

In accordance with exemplary embodiments, the CPU 1002 has appropriate structure to be a computer processor. In one arrangement, the computer CPU 1002 is more than one processing unit. The RAM 1018 interfaces with the computer bus 1034 to provide quick RAM storage to the CPU 1002 during the execution of software programs such as the operating system application programs, and device drivers. More specifically, the CPU 1002 loads computer-executable process steps from the storage medium 1022 or other media into a field of the RAM 1018 in order to execute software programs. Data is stored in the RAM 1018, where the data is accessed by the computer CPU 1002 during execution. In one exemplary configuration, the device 1000 includes at least 128 MB of RAM, and 256 MB of flash memory.

The storage medium 1022 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow the device 1000 to access computer-executable process steps, application programs and the like, stored on removable and non-removable memory media, to off-load data from the system 1000 or to upload data onto the system 1000. A computer program product, such as one utilizing a communication system may be tangibly embodied in storage medium 1022, which may comprise a machine-readable storage medium.

In accordance with an example implementation of the disclosed technology, the special-purpose hardware and instruction set may enable processing of a massive number of records to detect indicators of fraudulent activity. In some instances, the number of records when the initial data build is assembled, can approach or exceed 3 billion records in number. In accordance with an example implementation of the disclosed technology, these records may be processed by SALT to produce a relative build that can result in even more records and relationships. For example, in some instances, the number of records in the relative build can approach or exceed 30 billion records in number.

In accordance with an example implementation of the disclosed technology, the relative build records may be post-processed to provide a reduced set of records (for example approximately 14 billion records). This reduction in the number of records can be a result of eliminating duplicates, scrubbing data, correcting data errors, removing records having low accuracy or linkage confidence etc. In certain example implementations, the reduced set of records can include relationship type, relationship history, linkages among individual IDs, etc. In accordance with an example implementation, relationship linking may be calculated via graph analytics with the Knowledge Engineering Language (KEL) and/or SALT, as previously discussed, which may provide certain speed, efficiency, and/or memory utilization advantages over previous computation languages.

Certain example implementations of the disclosed technology may enable identification of errors in data. For example, data provided by information vendors can include errors that, if left undetected, could produce erroneous results. Certain example implementations of the disclosed technology may be used to measure the accuracy and/or quality of the available data, for example by cross-checking, so that the data be included, scrubbed, corrected, or rejected before utilizing such data in the full analysis. In accordance with an example embodiment of the disclosed technology, such data quality may be determined and/or improved by one or more of cross checking, scrubbing to correct errors, and scoring to use or reject the data.

In accordance with an example implementation of the disclosed technology, connections and degrees of separation between entities may be utilized. For example, the connections may include a list of names of known or derived business associates, friends, relatives, etc. The degrees of separation may be an indication of the strength of the connection. For example, two people having a shared residence may result in a connection with a degree of 1. In another example implementation, two people working for the same company may have a degree of 2. In one example implementation, the degree of separation may be inversely proportional to the strength of the connection. In other example embodiments, different factors may be contribute to the degree value, and other values besides integers may be utilized to represent the connection strength.

Implementations of the disclosed technology can provide the technical effects of improving credit performance estimation for applicants who have previously been rejected on a credit application. Implementations of the disclosed technology can further provide the technical effects of inferring credit risk/performance of a rejected applicant based on non-tradeline data.

Various implementations of the communication systems and methods herein may be embodied in non-transitory computer readable media for execution by a processor.

In the foregoing description, numerous specific details have been set forth. However, it is to be understood that implementations of the disclosed technology may be practiced without these specific details. In other instances, well-known methods, structures and techniques have not been shown in detail in order not to obscure an understanding of this description. References to "one implementation," "an implementation," "example implementation," "various implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form.

In some instances, the credit scorecard inference system 100 may improve the speed and accuracy of the scorecard inference and/or reject inference of applicants by special purpose modules for electronically processing the information in ways that are not possible by a human. In certain instances, the credit scorecard inference system 100 may be a set of hardware components.

Certain implementations of the disclosed technology are described above with reference to block and flow diagrams of systems and methods and/or computer program products according to example implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, implementations of the disclosed technology may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A computer-implemented method, comprising:
    receiving, from a first information source, applicant information associated with a credit application;
    querying one or more public or private databases with at least a portion of the applicant information;
    responsive to the querying, receiving from a second information source, non-tradeline data related to the applicant;
    receiving from a third information source, independent information related to the applicant, wherein the independent information is not provided by the applicant;
    determining, with one or more computer processors, relationships among the applicant information and the independent information by:
        creating a core join data structure with at least a portion of all available applicant information, non-tradeline data, and independent information;
        splitting the core join data structure into persisted parts, wherein the persisted parts are configured for updating a shared structure between versions in memory to reduce disk utilization; and
        clustering the persisted parts with one or more of the applicant information, the non-tradeline data, and the independent information;
    scoring, with one or more computer processors in communication with a memory, and using a predictive scoring model based at least in part on the non-tradeline data, at least one parameter of the applicant information and a prediction of the applicant's future credit performance, wherein scoring at least one parameter of the applicant information is based at least in part on determining relationships among the applicant records, the clustering, and the independent information;
    generating, based on the scoring, an estimated credit performance of the applicant over a predetermined period; and
    outputting an indication of the estimated credit performance.

2. The method of claim 1, wherein the applicant information includes at least a name, a social security number (SSN), and a street address.

3. The method of claim 1, wherein none of the non-tradeline data is provided by the applicant.

4. The method of claim 1, further comprising one or more of:
    determining, with the one or more computer processors, based at least in part on a comparison of the applicant information with at least a portion of the independent information, a first validity indication of the applicant information;
    creating, with the one or more computer processors, disambiguated applicant records responsive to the first validity indication by one or more of:
        performing data cleansing on one or more of the applicant information and the independent information to eliminate one or more name variations; and
        adding metadata record to one or more of the applicant information and the independent information;
    determining, with the one or more computer processors, relationships among the disambiguated applicant records by one or more of:
        creating a core join data structure with at least a portion of all available disambiguated applicant records;
        splitting the core join data structure into persisted parts; and
        clustering the persisted parts and the disambiguated applicant records; and
    wherein scoring at least one parameter of the applicant information is based at least in part on determining the relationships among the disambiguated applicant records.

5. The method of claim 1, wherein the at least one parameter of the applicant information comprises a distance between an applicant street address provided with the applicant information and a street address of one or more relatives or entities associated with the applicant.

6. The method of claim 1, wherein the at least one parameter of the applicant information comprises a plurality of records associating applicant social security number (SSN) and applicant street address.

7. The method of claim 1, wherein the at least one parameter of the applicant information comprises a plurality of unique social security numbers (SSNs) associated with a street address of the applicant.

8. The method of claim 1, wherein the at least one parameter of the applicant information comprises a plurality of sources reporting a social security number (SSN) of the applicant with a name of the applicant.

9. The method of claim 1, wherein the at least one parameter of the applicant information comprises a plurality of other entities associated with the applicant social security number (SSN).

10. The method of claim 1, further comprising scoring neighborhood fraud metrics based on a street address of the applicant and further based on one or more of: presence of businesses in the surrounding neighborhood; density of housing in the neighborhood; and median income in the neighborhood.

11. The method of claim 1, wherein receiving from the second information source, the non-tradeline data related to the applicant comprises receiving one or more records comprising one or more of housing records, vehicular records, marriage records, divorce records, hospital records, death records, court records, property records, incarceration records, tax records, bankruptcy records; collections records, eviction records, felony records, and utility records, wherein the utility records comprise one or more of utility hookups, disconnects, and associated service addresses.

12. A system, comprising:
   at least one memory for storing data and computer-executable instructions; and
   at least one processor configured to access the at least one memory and further configured to execute the computer-executable instructions to:
      receive, from a first information source, applicant information associated with a credit application, wherein the applicant information includes at least a name, a social security number (SSN), and a street address;
      query one or more public or private databases with at least a portion of the applicant information;
      responsive to the query, receive from a second information source, non-tradeline data related to the applicant;
      receive from a third information source, independent information related to the applicant, wherein the independent information is not provided by the applicant;
      determine relationships among the applicant information and the independent information by:
         creating a core join data structure with at least a portion of all available applicant information, non-tradeline data, and independent information;
         splitting the core join data structure into persisted parts, wherein the persisted parts are configured for updating a shared structure between versions in memory to reduce disk utilization; and
         clustering the persisted parts with one or more of the applicant information, the non-tradeline data, and the independent information;
      score, with the at least one processor, and using a predictive scoring model based at least in part on the non-tradeline data, at least one parameter of the applicant information and a prediction of the applicant's future credit performance, wherein the at least one parameter of the applicant information is scored based at least in part on determining relationships among the applicant records, the clustering, and the independent information;
      generate, based on the score, an estimated credit performance of the applicant over a predetermined period; and
      output an indication of the estimated credit performance.

13. The system of claim 12, wherein the at least one processor is further configured to:
   determine, based at least in part on a comparison of the applicant information with at least a portion of the independent information, a first validity indication of the applicant information;
   create disambiguated applicant records responsive to the first validity indication by one or more of:
      performing data cleansing on one or more of the applicant information and the independent information to eliminate one or more name variations; and
      adding metadata record to one or more of the applicant information and the independent information;
   determine relationships among the disambiguated applicant records by one or more of:
      creating a core join data structure with at least a portion of all available disambiguated applicant records;
      splitting the core join data structure into persisted parts; and
      clustering the persisted parts and the disambiguated applicant records; and
   wherein at least one parameter of the applicant information is scored based at least in part on determining the relationships among the disambiguated applicant records.

14. The system of claim 12, wherein the at least one parameter of the applicant information comprises a distance between the applicant street address provided with the applicant information and a street address of one or more relatives or entities associated with the applicant.

15. The system of claim 12, wherein the at least one parameter of the applicant information comprises a plurality of records associating the applicant SSN and the applicant street address.

16. The system of claim 12, wherein the at least one parameter of the applicant information comprises a plurality of unique SSNs associated with the street address of the applicant.

17. The system of claim 12, wherein the at least one parameter of the applicant information comprises a plurality of sources reporting the SSN of the applicant with the name of the applicant.

18. The system of claim 12, wherein the at least one parameter of the applicant information comprises a plurality of other entities associated with the applicant SSN.

19. The system of claim 12, further comprising scoring neighborhood fraud metrics based on the street address of the applicant and further based on one or more of:
   presence of businesses in the surrounding neighborhood; density of housing in the neighborhood; and median income in the neighborhood.

20. The system of claim 12, wherein receiving from the second information source, the non-tradeline data related to the applicant comprises receiving one or more records comprising one or more of housing records, vehicular records, marriage records, divorce records, hospital records, death records, court records, property records, incarceration records, tax records, bankruptcy records; collections records, eviction records, felony records, and utility records, wherein the utility records comprise one or more of utility hookups, disconnects, and associated service addresses.

* * * * *